Jan. 18, 1955 A. BOSCHI 2,699,934
RUBBER SPRING
Filed Sept. 23, 1948 2 Sheets-Sheet 1
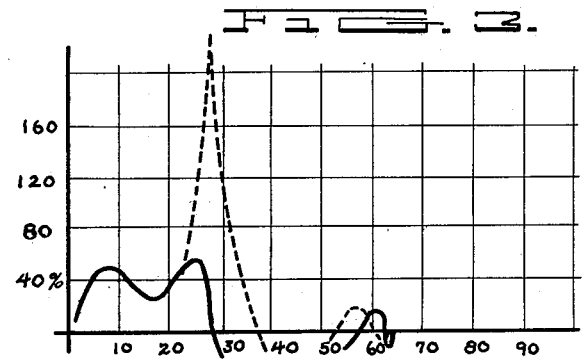
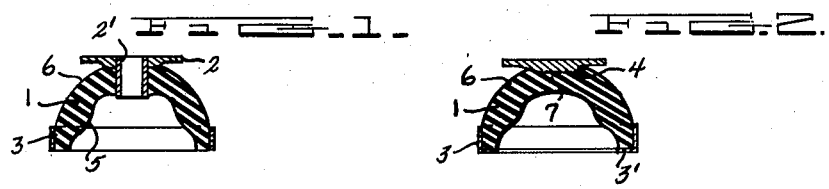
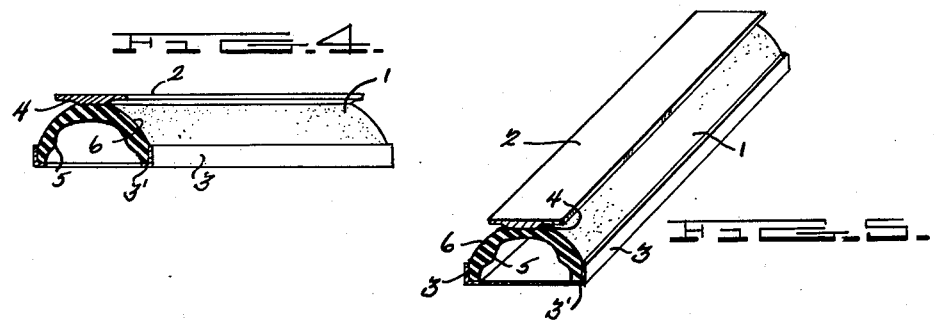
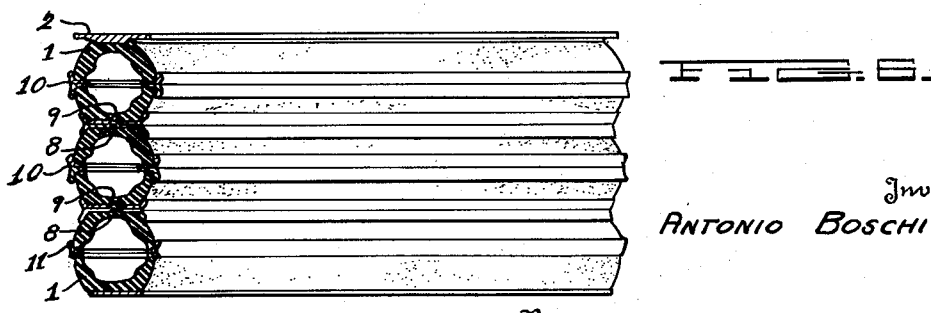
Inventor.
ANTONIO BOSCHI.
By
Stone, Boyden & Mack
ATTORNEYS, Jan. 18, 1955  A. BOSCHI  2,699,934
RUBBER SPRING
Filed Sept. 23, 1948  2 Sheets-Sheet 2
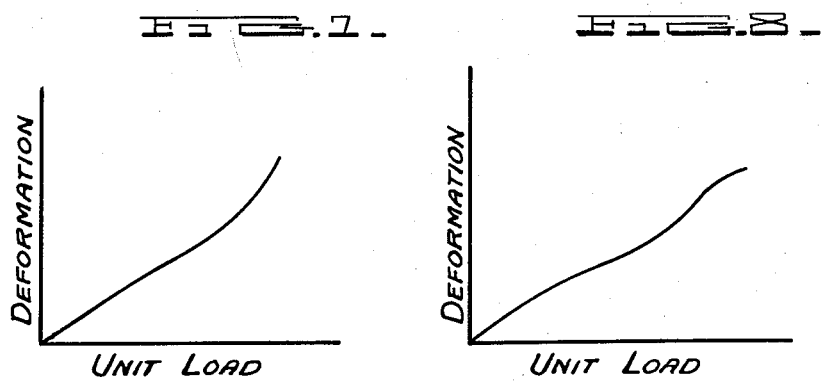
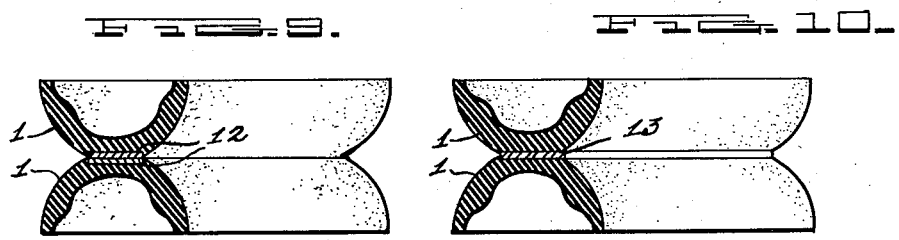
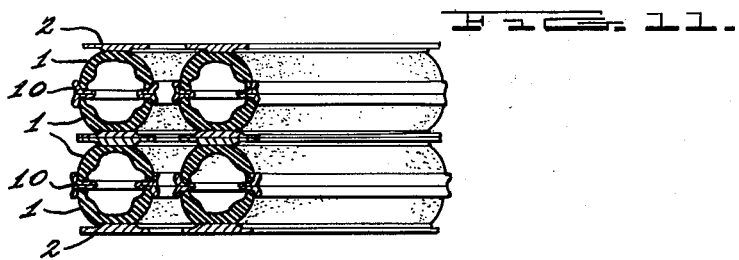
Inventor.
ANTONIO BOSCHI.
By
Stone, Boyden & Mack.
ATTORNEYS.

United States Patent Office 2,699,934
Patented Jan. 18, 1955

2,699,934

RUBBER SPRING

Antonio Boschi, Milan, Italy, assignor to Societa Applicazioni Gomma Antivibranti, Milan, Italy Application September 23, 1948, Serial No. 50,703

Claims priority, application Italy September 23, 1947

38 Claims. (Cl. 267—63)

This invention pertains to rubber springs for the elastic suspension of vehicle bodies, machinery and like objects, and more particularly has reference to such springs of the type wherein the rate of deformation of the rubber elements first decreases as the applied load increases up to a certain value (e. g., the net weight of the suspended body), then increases as the applied load increases above said value up to the maximum working load of the spring. Such springs have a relatively small rate of load-deformation under loads less than, or corresponding to, the net or unloaded weight of the supported machine or vehicle body, and a proportionally higher rate of deformation under increasing load, between such loads and the maximum permissible working load. It is a well known fact that the higher the rate of load-deformation of an elastic suspension under the actual total load, the more efficient is the damping of vibrations of the elastically suspended vibrating load, and by the use of such springs it is possible to obtain good damping of vibrations within moderate total deflections.

However, prior art springs of this type have always been characterized by the following disadvantages:

(1) The rubber elements are not uniformly stressed by the load. On the contrary, in certain zones, especially on the internal (concave) surfaces, where the prevailing stress is in tension, and therefore more dangerous than a compression or shear-flexion stress, the stresses may reach magnitudes which are deleterious to the useful life of the spring.

(2) In comparison with the weights they may support, the springs occupy a relatively large base area which is an important consideration, especially in the case of vehicle body suspension, where the space available for the springs is limited.

(3) It is impossible to place several resilient elments upon one another, so as to enable them to work in series and obtain the high rate of load-deformation required in many applications, because the spring could not have the necessary transverse stability. This is a serious deficiency when there are vibratory disturbances of low frequency.

The objects of this invention are to overcome the foregoing disadvantages in prior art springs in a simple and efficient manner.

With these and other objects in view which may be incident to my improvements, my invention consists in the combination and arrangement of elements hereinafter described and illustrated in the accompanying drawings, in which:

Fig. 1 shows, in transverse cross-section, a spring typical of the prior art, which is characterized by the above-mentioned disadvantages.

Fig. 2 is a view, similar to Fig. 1, showing one embodiment of my invention, when subjected to load.

Fig. 3 is a diagram showing the load-deformation under varying loads of the spring illustrated in Fig. 2, in terms of the percentage variation of the lengthening of the inner surface fibres of the spring (ordinates), according to the distance of the fibre from the center of the spring (abscissa).

Fig. 4 is an isometric view, partly in section, showing another embodiment of my invention wherein the spring (not under load) is given a particular shape in plan.

Fig. 5 is a view, similar to Fig. 4, wherein the spring is given another particular shape in plan.

Fig. 6 is a view, similar to Fig. 4, showing a series of springs superimposed one upon another, with provision for registering the positions of the several springs with reference to the vertical center line of the group, and a modification of the metal base of the spring.

Fig. 7 is a load-deformation diagram of the spring illustrated in Fig. 6, wherein the metal base of the spring is the same as shown in Fig. 2.

Fig. 8 is a load-deformation diagram, similar to Fig. 7, wherein the metal base of the spring is modified as indicated in Fig. 6.

Fig. 9 is an isometric view, partly in section, of another embodiment of my invention.

Fig. 10 is a view, similar to Fig. 9, of another modification of my invention, and Fig. 11 is a view, similar to Fig. 6, of still another embodiment of my invention, wherein two vertically disposed series of springs are employed in parallel.

The same reference numerals denote like elements throughout all the figures of the drawings.

Referring now to Fig. 1, showing a typical prior art spring of the type of which my invention is an improvement, the reference numeral 1 denotes a rubber element, of generally arcuate cross-section, having at its crown a cylindrical hole for the reception of a metal sleeve 2' which is integral with a load-transmitting metal plate 2, and serves to transmit part of the load imposed upon the plate 2 to the rubber element 1. An external metal frame 3 embraces the lower part of the rubber element 1 and serves to restrain said element from lateral spreading under load. When a load is applied to the plate 2, the rubber element 1 is deformed so that its outer surface 6 is stressed in compression and its inner surface, which is thickened near its mid zone 5, is stressed in tension.

In Fig. 2 which shows one embodiment of my invention, the metal sleeve 2' of Fig. 1 is omitted and the load-transmitting plate 2 is bonded to the outer surface 6 of the rubber element 1 only in the superior zone of the arch. The bottom of the plate 2 is specially contoured in order to better distribute the load to the thickened underlying zone 7 of the rubber element 1 and to vary the load-deformation curve of the rubber, as indicated in Fig. 3.

The arch-shaped cross-section of the rubber element 1 is peculiarly effective in obtaining one of the principal objects of my invention, in that such shape, in conjunction with the specially contoured, contacting surface of the load-transmitting plate 2, causes the rate of deformation of the rubber element to first decrease as the applied load increases, up to a selected value of load, and then increase as the applied load increases above said value. Also by making the upper, central, crown portion and haunch (side) portions of the arch thicker than the intermedial parts between said crown and haunch portion (see Fig. 4), the tensile stresses in the rubber under load are substantially reduced, and all the stresses in the rubber element are more evenly distributed, as indicated in Fig. 3.

The outer rigid metal frame 3 is provided with a horizontal flange 3' which serves as a support for the bottom surfaces of the rubber element 1 and reinforces the restraining action of the frame 3 against lateral thrust of the rubber element 1 under load. The changes shown in Fig. 2 from the construction shown in Fig. 1 secure several important advantages, as follows:

(1) Instead of employing a load-transmitting plate having a central cylindrical sleeve portion extending through the thick central part of the rubber element (as in Fig. 1) which causes a high stress in the zone 5 of the element, the arrangement shown in Fig. 2 is devoid of an opening in the thick crown portion of the rubber element and the transmission of load from the plate 2 to the rubber element 1 is confined to the upper central portion of the element.

(2) The thick central portion 7 of the rubber element 1, which immediately surrounds the axis of the applied load, becomes deformed in the use of the spring and is therefore most usefully employed in the operation of the spring.

(3) The load-transmitting plate 2 engages a zone in the external surface 6 of the rubber element 1 which in the use of the spring is generally compression-stressed and hence can sustain heavier stresses than other zones of the element.

(4) The load pressure is evenly distributed via the thick central portion 7 throughout the whole mass of rubber element 1, with the result that the internal surface 5 is more uniformly stressed than it would be otherwise, and excessive stresses in this surface are avoided.

(5) The conditions of operation of the spring are improved by reason of the above effects and the useful life of the spring is proportionately lengthened.

(6) The reinforced rigid frame 3 of Fig. 2 more effectively restrains the rubber element 1 from lateral spread under load, thereby increasing its load bearing capacity.

The above improved results of my invention are strikingly illustrated in Fig. 3 in which the dotted line shows the percentage variation of the lengthening (and therefore, the approximate percentage variation in stress) of the inner surface fibre of the rubber element 1 (of Fig. 1) under axial load, according to the distance of the fibre from the center line of the spring, and the heavy full-line curve shows the corresponding variation in the rubber element of Fig. 2. It is quite evident that the second curve is much more uniform than the first and has no high point of tension stress. It is also to be particularly noted in Fig. 3 that the full line curve, corresponding to the construction of Fig. 2, shows that the fibres of the inner surface 5 of the rubber element 1 are in relative compression near the mid-portion of the curve, in comparison with the fibre on either side of said mid-portion. Since it is well known that rubber resists compression stresses much better than tension stresses, the transmission of stress from the load-transmitting plate 2 directly to the compression-stressed part of rubber element 1, instead of to the tension-stressed part thereof, has the effect of reducing the tensile stresses in said element which is of itself an important advantage. Moreover, experimental trials have shown that the shape of the full line curve of Fig. 3, and hence the load-deformation performance of the rubber element 1, can be regulated as desired by proper proportioning and contouring of the bottom surface 4 of the load-transmitting plate 2, in order to meet required operating conditions of the spring.

From the foregoing it is clear that the results obtained from the embodiment of my invention illustrated in Fig. 2 completely overcomes the first disadvantage of prior art springs mentioned above.

In order to overcome the second disadvantage of prior art springs mentioned above, the improved spring shown in Fig. 2, with the same arcuate cross-section and load-deformation characteristics already described, may be made to occupy a smaller base surface, while supporting a given load, by properly shaping the spring in plan. Thus, the shape in plan of the spring, as regards its rubber element, may be that of a strip which is obtained when the arcuate cross-section of rubber element 1 of Figures 1 and 2 is moved so that its center of gravity travels along a closed line of circular, elliptical, oval, polygonal or other closed shape, or an open line of rectilinear, interrupted, curved or other open shape, according to the requirements of the available space. Figures 4 and 5 show, by way of example, two embodiments of my invention which employ this feature; the two spring having respectively a circular and a rectilinear plan. Fig. 4 shows a fragmentary portion of a circular embodiment.

The resilient elements of a number of springs, of the forms shown in Figs. 4 and 5, may be readily superimposed upon one another without any danger of compromising the transverse stability of the multi-element spring and therefore of the elastically suspended machine or vehicle. Since such springs have a greater rate of load-deformation than can be obtained from prior art springs, they overcome the third disadvantage mentioned above.

Where, as just indicated, a number of resilient elements are superimposed upon one another, there may be inserted between each pair of adjacent resilient elements in the pile a pair of rigid load-transmitting plates which have the additional function of registering the location of the elements mutually with respect to one another. Figure 6 shows an arrangement for this purpose, wherein alternate intermediate load-transmitting plates 2 are provided with central ribs 8 formed to fit into correspondingly shaped grooves 9 in adjacent plates 2. In the arrangement shown in Fig. 6, rigid base frames 10, equivalent to a pair of flanges 3 of Fig. 2, rigidly attached to each other across their horizontal faces, are inserted between the open sides of each adjacent pair of resilient elements 1 and replace the single-flanged frame 3 of Fig. 2. The flanges of frames 10 may be formed with specially shaped welts 11 whose purpose is also to modify the load-deformation curve of the spring under load in order to obtain a particular predetermined curve, such as that shown in Fig. 8, instead of the curve shown in Fig. 7 which would be obtained in the absence of these welts.

The required shape of the load-deformation curve may also be obtained, within certain limits, by changing the relative size and shape of abutting or intermediate load-transmitting rigid plates, and suitably shaping those portions of the external surfaces of two adjacent resilient elements which, during the deformation of the spring, come into contact with each other. Thus, for example, Fig. 9 shows such an arrangement, wherein the load-transmitting plates 12 between two adjacent rubber elements 1 consist of flat metal strips whose widths are less than those of the flattened crown surfaces of the rubber elements in which they are countersunk. When such a spring is deformed under load the outer crown surfaces of the adjacent rubber elements which overhang the metal plates 12 progressively come into contact with each other as the load increases. If desired, the two rubber elements 1 may be bonded to a single load-transmitting metal plate 13, common to both, as shown in the modified construction illustrated in Fig. 10.

Moreover, two or more resilient elements may be placed side by side, or concentrically one within the other, so that they work in parallel. In this way it is possible to proportion the cross-sections of the rubber elements to the load which the spring has to support. Such an arrangement can be also employed where several elements are disposed in a pile one upon another, as shown by way of example in Fig. 11. In such a case the elements operate in parallel, while the several layers regarded as such operate in series.

By using suitable constructional means, it is also possible to arrange a group of elements in a pile operating in parallel with another group in the same pile, or an arrangement may be employed wherein some elements operate only in one direction and are inoperative in another direction, as disclosed and claimed in my Italian Patent No. 427,217 (filed February 28, 1947, and issued November 13, 1947).

In the several embodiments of my invention the load-transmitting plates, which are preferably composed of metal, may, some or all of them, be bonded to the resilient elements during or after the process of the vulcanization thereof.

While I have shown and described the preferred embodiments of my invention, I desire it to be understood that I do not limit the invention to the constructional details disclosed by way of illustration, as these may be changed and modified by those skilled in the art without departing from the spirit of my invention or exceeding the scope of the appended claims.

I claim:

1. A spring comprising a rigid, load-transmitting plate and a contacting rubber element of continuous, arch-shaped cross-section, so proportioned and arranged that said plate contacts only the upper central, crown portion of said section throughout the working range of said spring, so that the transmission of load from said plate to said element is confined to said crown portion, and said rubber element resists said load by stresses characteristic of arch action, throughout its working range.

2. A spring according to claim 1 wherein the crown and haunches of said arch-shaped rubber element have portions thicker than the intermedial arch portions therebetween, so that the stresses in said element are more evenly distributed throughout the rubber mass.

3. A spring according to claim 1 wherein the surface of said plate which contacts said rubber element is curved so that the load-deformation curve of said element has a selected, predetermined shape.

4. A spring according to claim 1, wherein the cross-sections of said plate and of said rubber element have curved portions so shaped as to cause the load-deformation of the spring to conform to a selected, predetermined relationship, as the load on the spring is increased.

5. A spring according to claim 1, wherein the lower part of said rubber element is supported and restrained against lateral spread under load by a rigid frame, of L-shaped cross-section, having a vertical flange which embraces a substantial area of the outer periphery of said part.

6. A spring according to claim 1, wherein said rubber element has the shape of a strip generated by moving said cross section so that its center of gravity travels along an open curved line of selected, predetermined form.

7. A spring comprising a plurality of vertical piles of rubber elements placed side by side, in the spring, each pile comprising a plurality of contacting rubber elements of arch-shaped cross-section, each constructed according to claim 1, and superimposed upon one another, with a pair of rigid load-transmitting plates interposed between each adjacent pair of rubber elements, whereby the rubber elements in each vertical pile operate in series and said piles operate in parallel, when said spring is under load.

8. A spring comprising a plurality of contacting rubber elements of arch-shaped cross-section, each constructed according to claim 1, and placed side by side in the spring assembly so as to operate in parallel therein.

9. A spring according to claim 8 wherein each rubber element has the shape of a strip generated by moving the center of gravity of the cross-section of said element along a line of selected predetermined form.

10. A spring comprising a pair of coacting rubber elements, each constructed according to claim 1 and superimposed one upon another, so that their crown portions are contiguous, with a pair of rigid load-transmitting plates interposed between said pair of rubber elements, whereby the rubber elements operate in series when the spring is deformed under load.

11. A spring according to claim 10 wherein each of said plates is bonded to its adjacent rubber elements.

12. A spring according to claim 10 wherein each of said rubber elements has a rigid frame which supports and restrains the base portions of said rubber elements from lateral spread under load.

13. A spring comprising a plurality of superimposed pairs of rubber elements, each pair being constructed and arranged according to claim 10 and each adjacent pair of rubber elements has an interposed rigid frame provided with flanges having outwardly curved welts on their outer edges which coact with contacting surfaces of adjacent rubber elements, so as to modify the load-deformation performance of the spring in a selected predetermined manner, to meet operating requirements of the spring.

14. A spring according to claim 10 wherein each rubber element has the shape of a strip generated by moving the cross-section of element so that its center of gravity travels along a non-circular closed line of selected predetermined form.

15. A spring comprising a plurality of coacting rubber elements each constructed according to claim 1 and superimposed one upon another, with a pair of rigid load-transmitting plates interposed between each adjacent pair of rubber elements; each of said plates alternately having a central groove or a ridge which interfit with each other and serve to register the location of said rubber elements in vertical alignment with each other.

16. A spring according to claim 15 wherein each rubber element has the shape of a strip generated by moving the cross-section of said element so that its center of gravity travels along a line of selected predetermined form.

17. A spring comprising a plurality of contacting rubber elements, of arch-shaped cross-section, each constructed according to claim 1, and superimposed upon one another and disposed convex face to convex face, and rigid load-transmitting plate means interposed between each adjacent pair of rubber elements and bonded to each of said elements.

18. A spring comprising a plurality of component members operatively connected together each member comprising a rigid load-transmitting plate, a rigid base plate, and a rubber element interposed between said plates, said rubber element having an arch-shaped cross-section, according to claim 1, and of such varying thickness from its crown to its base that the rate of deformation of the spring under load is relatively small up to the net weight of the resiliently supported load and then becomes proportionally higher under loads above said net weight, so that the curvature of the load-deformation-curve of said spring is inverted at the point corresponding to said net weight load.

19. A spring according to claim 18, wherein both a rigid load-transmitting plate and a rigid base plate are bonded to each interposed rubber element.

20. A spring according to claim 18, wherein the load-receiving crown portion of each rubber element is thicker than the adjacent arch portions of the element and is deformed so as to have the same contour as the contacting curved surface of the adjacent load-transmitting plate, when the element is subject to load, so that the stresses in said element are more evenly distributed throughout its rubber mass.

21. A spring according to claim 20, wherein said load-transmitting plate has a contoured surface which contacts the adjacent rubber element progressively as the load on said spring increases so that the load-deformation curve of said element has a selected predetermined shape.

22. A spring according to claim 21, wherein both the outer surface of each rubber element and the contacting inner surface of each adjacent load-transmitting plate have portions so curved as to cause the load-deformation of the spring to conform to a selected predetermined relationship, as the load on the spring is increased.

23. A spring according to claim 18, wherein each alternate component member is inverted and superimposed upon the other, so that a pair of load-transmitting plates and a pair of base plates are in contact and alternately interposed between each adjacent pair of rubber elements, each of said contacting plates alternately having a central groove or a ridge which interfit with each other, whereby all the rubber elements operate in series when the spring is deformed under load and are held in vertical alignment with each other.

24. A spring according to claim 23, wherein each of said plates is bonded to its contacting rubber element.

25. A spring according to claim 23, wherein each adjacent pair of base plates are each provided with flanges having outwardly curved welts on their outer edges which coact with contacting surfaces of adjacent rubber elements, so as to modify the load-deformation performance of the spring in a selected manner, to meet operating requirements of the spring.

26. A spring according to claim 18, wherein said component members are placed side by side in the spring assembly, so as to operate in parallel therein.

27. A spring according to claim 18, wherein each component member has the shape of a strip generated by moving its cross section along a line of selected predetermined form.

28. A spring according to claim 27, wherein said component spring members constituting the whole spring are placed side by side in the spring assembly, so as to operate in parallel therein.

29. A spring according to claim 27, wherein each alternate component member is inverted and superimposed upon the other, so that a pair of load-transmitting plates and a pair of base plates are in contact and alternately interposed between each adjacent pair of rubber elements, each of said contacting plates alternately having a central groove or a ridge which interfit with each other, whereby all the rubber elements operate in series when the spring is deformed under load and are held in vertical alignment with each other.

30. A spring according to claim 29, wherein each of said plates is bonded to its contacting rubber element.

31. A spring according to claim 29, wherein each contacting pair of base plates are each provided with flanges having specially shaped welts on their outer edges which coact with contacting surfaces of adjacent rubber elements, so as to modify the load-deformation performance of the spring in a selected manner, to meet operating requirements of the spring.

32. A spring according to claim 18, wherein said component members are placed with respect to one another so as to form a plurality of vertical piles of rubber elements placed side by side in the spring assembly, each pile comprising a plurality of rubber elements superimposed upon one another, with a pair of load-transmitting plates and a pair of base plates alternately interposed between each adjacent pair of rubber elements, and each of said plates alternately having a central groove or a ridge which interfit with each other, whereby all the rubber elements in each vertical pile operate in series and said piles operate in parallel, when the whole spring is under load, and said rubber elements are held in vertical alignment with each other.

33. A spring according to claim 32, wherein each of said plates is bonded to its contacting rubber element.

34. A spring according to claim 32, wherein each adjacent pair of rubber elements has an interposed rigid frame provided with flanges, having specially shaped welts on their outer edges which coact with contacting surfaces of adjacent rubber elements, so as to modify the load-deformation performance of the spring in a predetermined manner, to meet operating requirements of the spring.

35. A spring according to claim 27, wherein said component members are placed with respect to one another so as to form a plurality of vertical piles of rubber elements placed side by side, in the spring assembly, each pile comprising a plurality of rubber elements superimposed upon one another, with a pair of load transmitting plates and a pair of base plates alternately interposed between each adjacent pair of rubber elements, and each of said plates alternately having a central groove or a ridge which interfit with each other, whereby all the rubber elements in each vertical pile operate in series and said piles operate in parallel, when the whole spring is under load, and said rubber elements are held in vertical alignment with each other.

36. A spring according to claim 35, wherein each of said plates is bonded to its contacting rubber element.

37. A spring according to claim 35, wherein each adjacent pair of rubber elements has an interposed rigid frame provided with flanges having specially shaped welts on their outer edges which coact with contacting surfaces of adjacent rubber elements, so as to modify the load-deformation performance of the spring in a predetermined manner, to meet operating requirements of the spring.

38. A spring comprising a plurality of contacting rubber elements, each of arch-shaped cross-section, superimposed upon one another and disposed in alternate layers, convex face to convex face, and a pair of rigid load-transmitting plates interposed between each adjacent pair of rubber elements; said rubber elements and plates being so arranged that the convex faces of said rubber elements contact each other when the spring is under load.

References Cited in the file of this patent

UNITED STATES PATENTS

| 26,723 | Vose | Jan. 3, 1860 |
| 928,520 | Huysmans | July 20, 1909 |
| 1,901,945 | Avery | Mar. 21, 1933 |

FOREIGN PATENTS

| 220,617 | Switzerland | Apr. 15, 1942 |
| 641,316 | Great Britain | Aug. 9, 1950 |
| 687,800 | Germany | Feb. 9, 1940 |